United States Patent [19]
Lee

[11] Patent Number: 5,838,856
[45] Date of Patent: Nov. 17, 1998

[54] OPTICAL-FIBER CABLE CONNECTOR ASSEMBLY

[75] Inventor: Ho-Kyung Lee, Incheon, Rep. of Korea

[73] Assignee: Daewoo Telecom, Ltd., Incheon, Rep. of Korea

[21] Appl. No.: 740,399

[22] Filed: Oct. 29, 1996

[30] Foreign Application Priority Data

Oct. 31, 1995 [KR] Rep. of Korea ................. 1995-38970

[51] Int. Cl.⁶ ................................................ G02B 6/40
[52] U.S. Cl. ................................ 385/54; 385/53; 385/55; 385/56; 385/59; 385/64; 385/71; 385/136; 385/137
[58] Field of Search .................................. 385/53, 54, 55, 385/56, 58, 59, 62, 64, 71, 136, 137

[56] References Cited

U.S. PATENT DOCUMENTS

| | | | |
|---|---|---|---|
| 4,385,801 | 5/1983 | Bubanko | 385/64 X |
| 4,544,233 | 10/1985 | Iwamoto et al. | 385/55 X |
| 4,759,600 | 7/1988 | Caron et al. | 385/53 X |
| 4,818,058 | 4/1989 | Bonanni | 385/59 X |
| 4,973,127 | 11/1990 | Cannon, Jr. et al. | 385/56 X |
| 4,986,625 | 1/1991 | Yamada et al. | 385/55 X |
| 5,037,179 | 8/1991 | Bortolin et al. | 385/54 |
| 5,134,673 | 7/1992 | Stephenson et al. | 385/56 |
| 5,379,361 | 1/1995 | Maekawa et al. | 385/65 |
| 5,430,819 | 7/1995 | Sizer, II et al. | 385/59 |
| 5,555,332 | 9/1996 | Dean et al. | 385/53 |
| 5,600,747 | 2/1997 | Yamakawa et al. | 385/59 |

FOREIGN PATENT DOCUMENTS

| | | | |
|---|---|---|---|
| 1 599 688 | 10/1981 | United Kingdom | 385/53 X |
| 2 174 821 | 12/1986 | United Kingdom | 385/53 X |

*Primary Examiner*—Brian Healy
*Attorney, Agent, or Firm*—Pennie & Edmonds, LLP

[57] ABSTRACT

A connector assembly for connecting two optical-fiber ribbons, each of which involves at least one optical fiber, is disclosed. The connector assembly includes a pair of connectors each of which is provided with a contact portion protruding from a leading end thereof and a plurality of through-holes into each of which the optical fiber is fitted, an alignment member provided with a central hole and a case having two pair of clamping members. The connectors are connected through the alignment member in such a way that the contact portions are, from both outsides to inside, fitted into the central hole to come in a face-to-face contact with each other. The connectors and the alignment member are inserted in the case and the opposite clamping members urge the connectors toward each other, thereby securely holding the connectors connected in position.

9 Claims, 8 Drawing Sheets

FIG.5
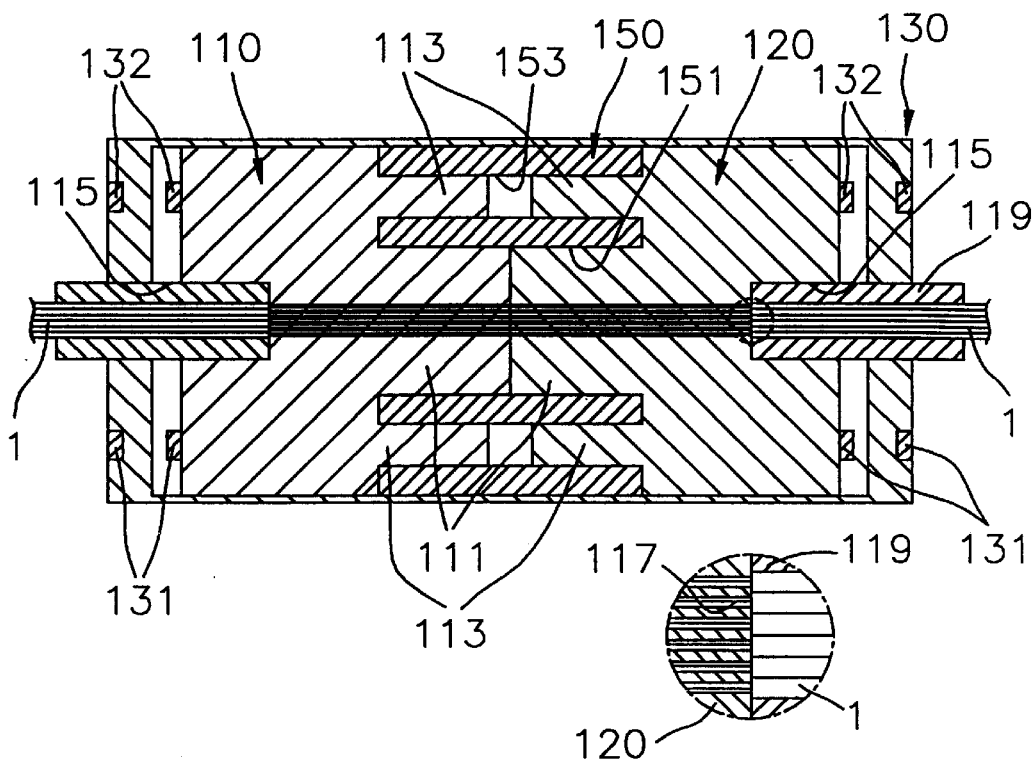
FIG.5a
FIG.6
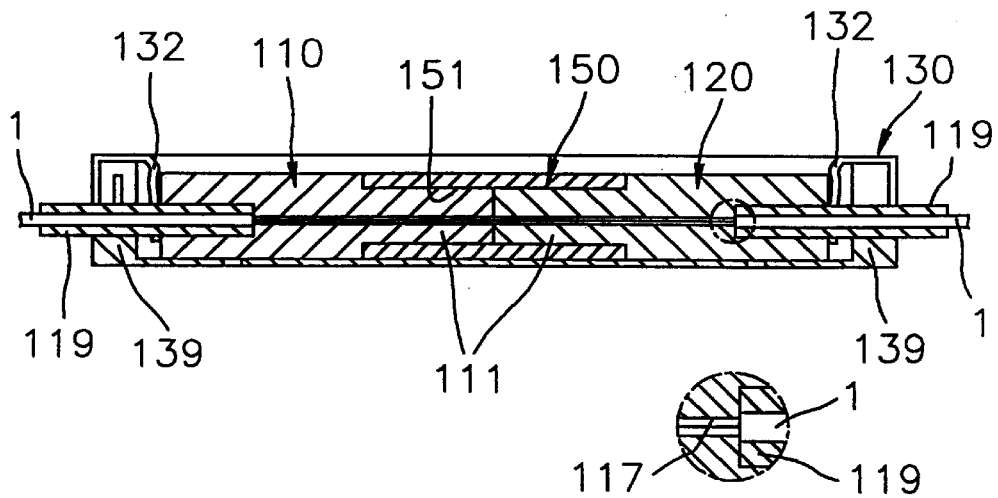
FIG.6a

FIG.13
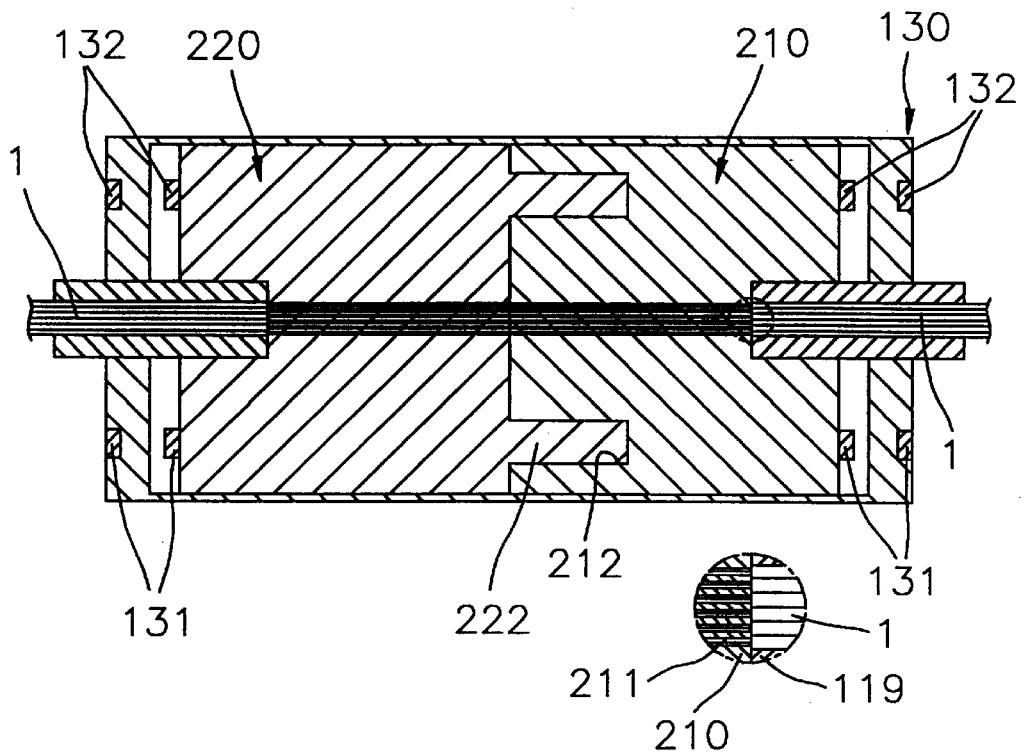
FIG.13a
FIG.14
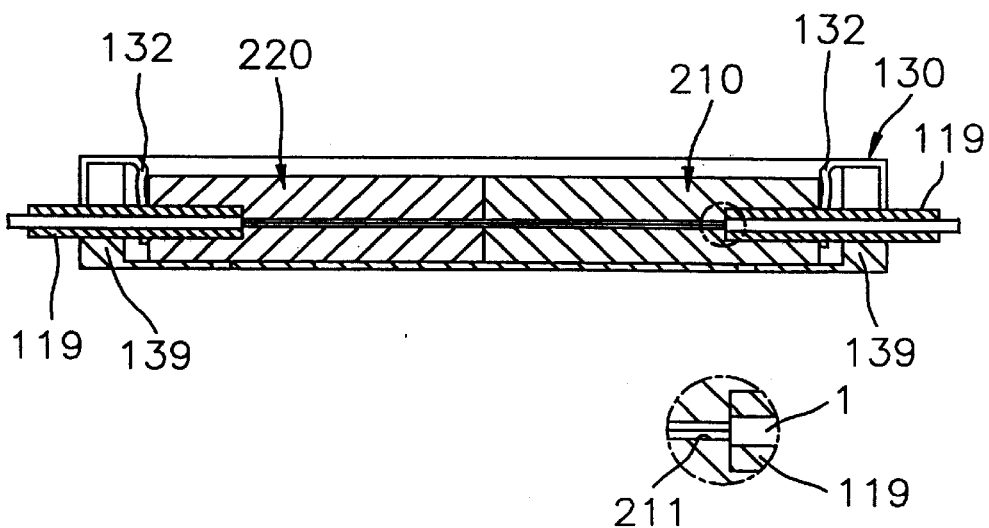
FIG.14a

OPTICAL-FIBER CABLE CONNECTOR ASSEMBLY

FIELD OF THE INVENTION

The present invention relates to a connector assembly for connecting optical fibers; and, more particularly, to an improved connector assembly capable of securely holding the connection between the optical fibers.

DESCRIPTION OF THE PRIOR ART

As is well known, a connector is used in connecting, e.g., two optical-fiber cables or ribbons each of which involves at least one optical fiber.

There is shown in FIG. 1 a typical connector assembly, wherein a pair of connectors 10, 20 are held connected by a clamping member 30 urging the connectors 10, 20 toward each other.

Furthermore, if desired, a plurality pairs of connectors are stacked and combined together by using a plurality of binder pins 40 which are fitted through a plurality of binding holes 50 formed on the connectors 10, 20, respectively, as shown in FIG. 2.

However, in such a conventional connector assembly, when it is installed in, e.g., the deep sea, the connectors are apt to be damaged by external factors such as water pressure, current and the like, thereby resulting in a disconnection between the optical fibers.

SUMMARY OF THE INVENTION

It is, therefore, a primary object of the invention to provide an improved connector assembly capable of securely holding the connector and of preventing thereof from being influenced by external factors.

In accordance with an aspect of the present invention, there is provided a connector assembly for connecting two optical cables each of which involves at least one optical fiber, the connector assembly comprising: a pair of connectors, each of which is provided with at least one through-hole into which the optical fiber is fitted, wherein one of the connectors has a pair of guide holes and the other has a pair of guide pins fitted into the guide holes, respectively; and a case provided with a bottom plate, aplurality of side walls and at least one pair of clamping members fixed to two of the side walls facing each other, respectively, the clamping members facing each other, wherein the connectors are inserted in the case and the opposite clamping members urge the connectors to come in a face-to-face contact with each other.

In accordance with another aspect of the present invention, there is provided a connector assembly for connecting two optical cables each of which involves at least one optical fiber, the connector assembly comprising: a pair of connectors each of which is provided with a contact portion protruding from a leading end thereof and a plurality of through-holes into each of which the optical fiber is fitted, the through-holes running between a leading end of the contact portion and a rear end of the connector; an alignment member provided with a central hole, wherein the contact portions of the connectors are, from both outsides to inside, fitted into the central hole; and a case provided with a bottom plate, a plurality of side walls and at least one pair of clamping members fixed to two of the side walls facing each other, respectively, the clamping members facing each other, wherein the connectors and the alignment member are inserted in the case and the opposite clamping members urge the connectors toward each other.

BRIEF DESCRIPTION OF THE DRAWINGS

The above and other objects and features of the instant invention will become apparent from the following description of preferred embodiments taken in conjunction with the accompanying drawings, in which:

FIG. 5 and 5a present a cross-sectional top view of the connector assembly in FIG. 3;

FIG. 6 and 6a present a cross-sectional side view of the connector assembly in FIG. 3;

FIG. 13 and 13a present a cross-sectional top view of the connector assembly in FIG. 11; and FIG. 14 and 14a present a cross-sectional side view of the connector assembly in FIG. 11.

DETAILED DESCRIPTION OF THE PREFERRED EMBODIMENTS

Figure 1:
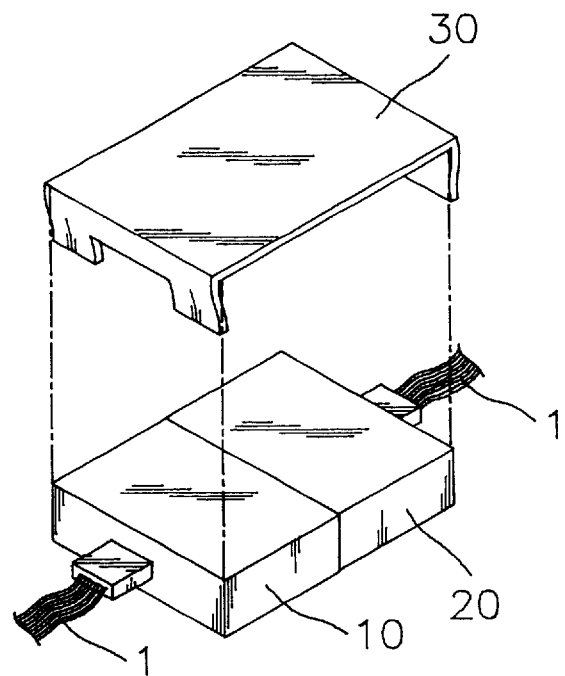
FIG. 1 represents a schematic exploded perspective view of a conventional connector assembly.
Figure 2:
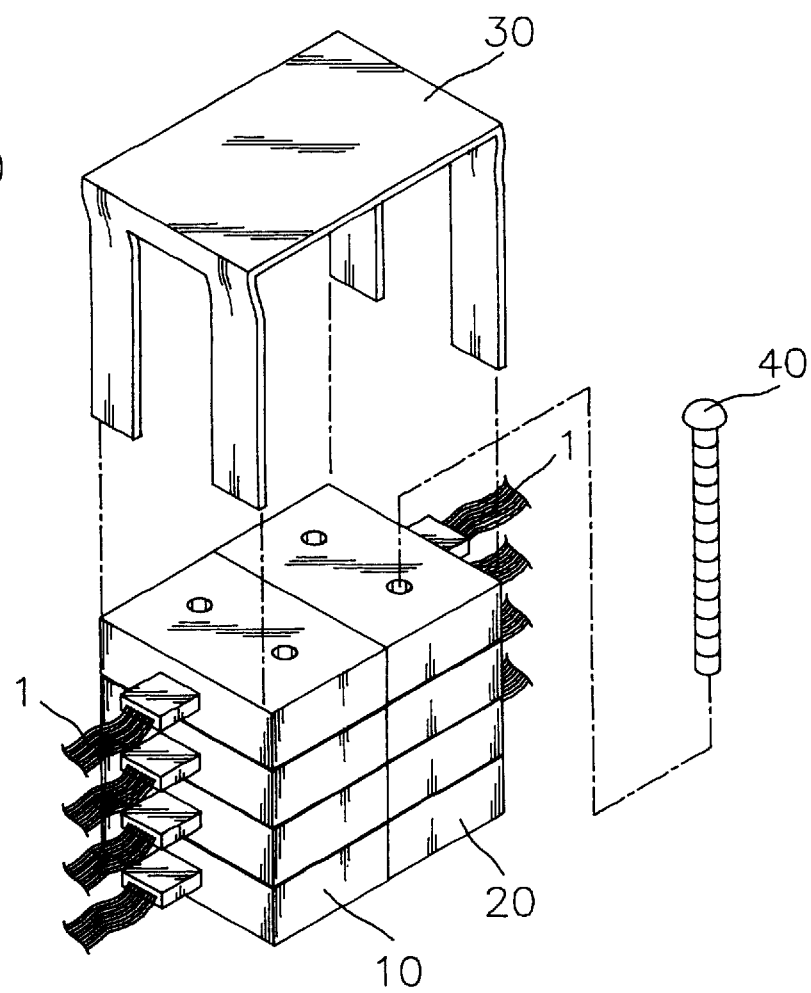
FIG. 2 depicts a schematic exploded perspective view of another conventional connector assembly, wherein a plurality of connectors are stacked and combined together.
Figure 3:
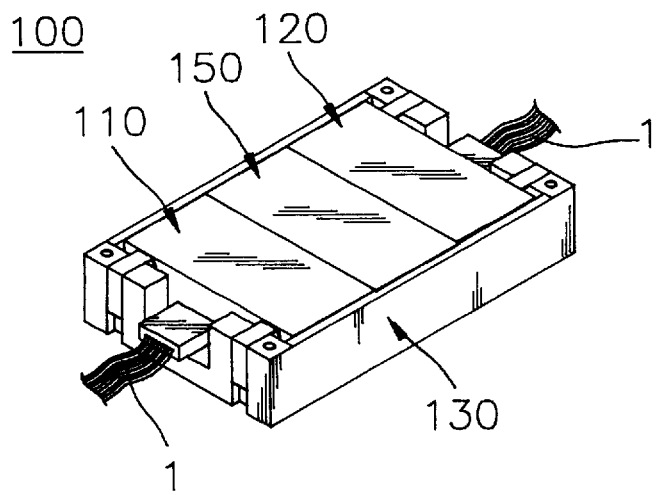
FIG. 3 sets forth a perspective view of a connector assembly in accordance with the first preferred embodiment of the present invention.
Figure 4:
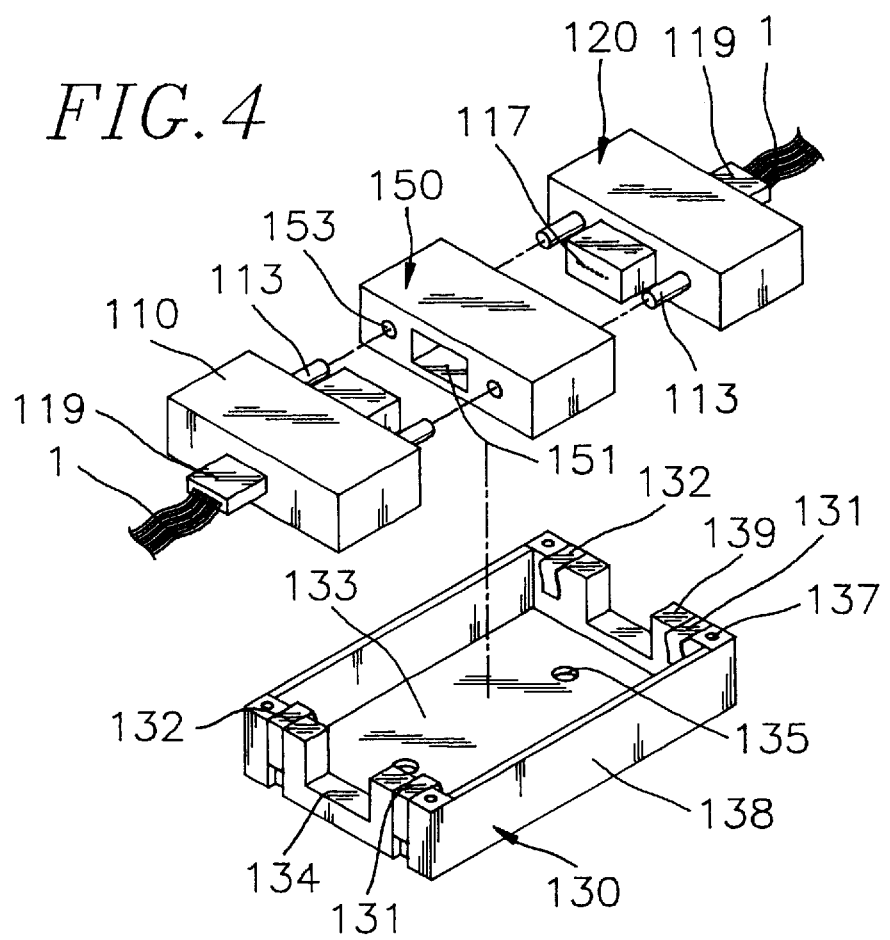
FIG. 4 illustrates an exploded perspective view of the connector assembly in FIG. 3.

There are shown in FIGS. 3 to 7 various views of a connector assembly for connecting optical-fiber cables or ribbons 1 in accordance with a preferred embodiment of the present invention.

The connector assembly 100 comprises a pair of connectors 110, 120, an alignment member 150 for precisely aligning the connectors 110, 120 and a case 130 into which the connectors 110, 120 and the alignment member 150 are fitted.

Each of the connectors 110, 120 is provided with a contact portion 111, a pair of guide pins 113, a cavity 115 and a plurality of through-holes 117. The contact portion 111 and the guide pins 113 protrude from the leading surface of the connector, the contact portion 111 being located between the guide pins 113. It is preferable that the length of the pin 113 be less than that of the contact portion 111. The cavity 115 is formed on the rear surface of each connector 110, 120. The through-holes 117 are formed on the leading surface of the contact portion 111 and are in communication with the cavity 115.

A boot 119 encompasses a part of, e.g., a multi-fiber ribbon 1. A sheath of the leading portion of the ribbon 1 which is not encompassed by the boot 119 is removed so that the fibers in the ribbon 1 are exposed. The boot 119 is inserted into the cavity 115 in such a way that each of the exposed fibers is fitted into the corresponding through-hole 117 and terminated at the leading end of the contact portion 111. The boot 119 is made of a flexible material, e.g., rubber, to minimize stress which is applied to the fiber ribbon 1.

The alignment member 150 is provided with a central hole 151 into which the contact portions 111 of the connectors 110, 120 are adapted to fit and a pair of guide holes 153 into which the guide pins 113 are adapted to fit, respectively. The connectors 110, 120 are connected to each other through the alignment member 150 in such a way that the contact portions 111 and the guide pins 113 of the connectors 110, 120 are, from both outsides to inside, inserted into the central hole 151 and the guide holes 153, respectively, thereby allowing the opposite optical fibers to come in contact with each other.

The case 130 is of a substantially rectangular shape suited to the configuration of the connectors 110, 120 and the alignment member 150 coupled together. The case is provided with a bottom plate 133, two longer side walls 138, two shorter side walls 139, two pairs of clamping members 131, 132 and a plurality of holes 135 formed on the bottom plate 133. Each pair of clamping members 131, 132 are fixed to the shorter side walls 139, respectively, facing each other. Each of the shorter walls 139 is provided with a cut-out portions 134 disposed between the clamping members 131 and 132. When the connectors 110, 120 and the alignment member 130 are inserted in the case 130, each pair of clamping members 131, 132 urge the connectors 110, 120 to come in a face-to-face contact with each other, thereby ensuring the opposite fibers to be connected, as shown in FIGS. 5, 5b, 6 and 6a.

Figure 7:
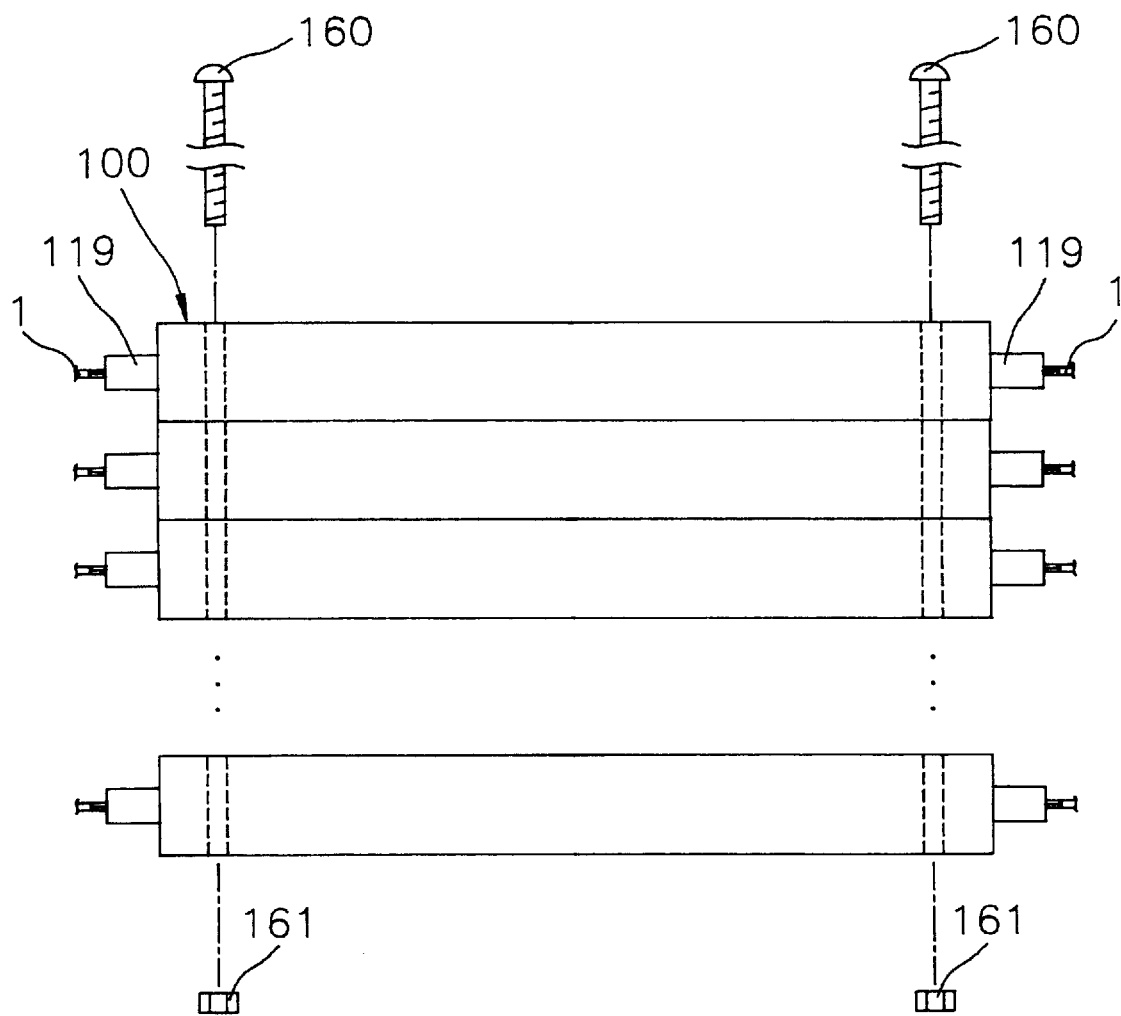
FIG. 7 illustrates a side view of a plurality of connector assemblies, in accordance with the first preferred embodiment of the present invention, stacked and combined together.

In addition, a binding hole 137 is formed at each corner of the case 130 so that, if desired, a plurality of connector assemblies can be combined together by using an fastening means, e.g., bolts 160 and nuts 161, the bolts 160 being fitted through the binding holes 137 of each case 130, respectively, as shown in FIG. 7.

Figure 8:
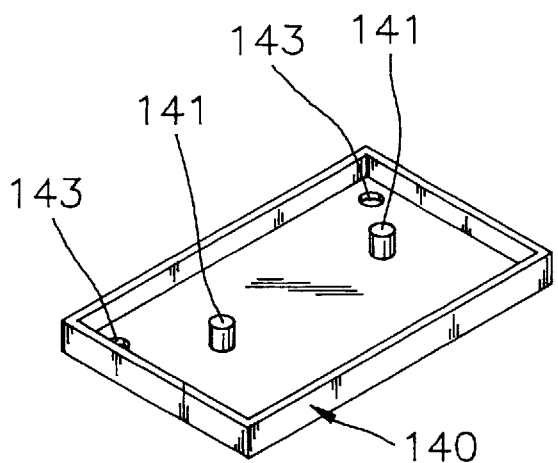
FIG. 8 demonstrates a perspective view of a cover of the present invention.
Figure 9:
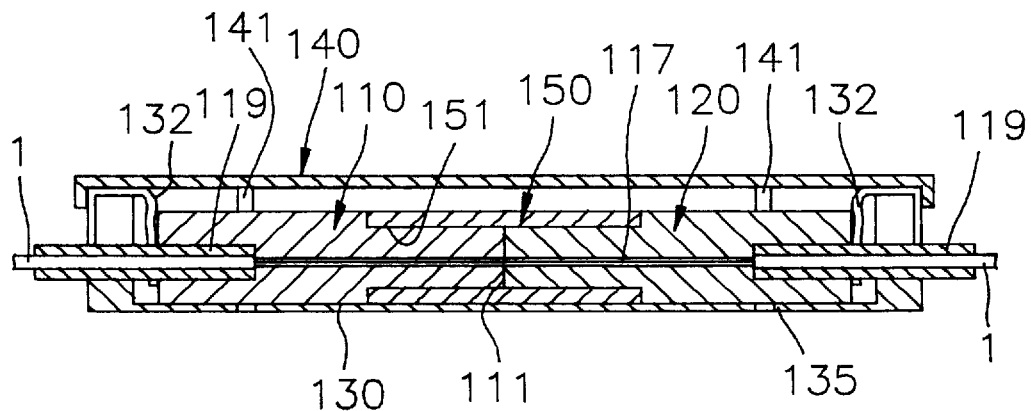
FIG. 9 provides a cross-sectional side view of the connector assembly of the first preferred embodiment covered with the cover.
Figure 10A:
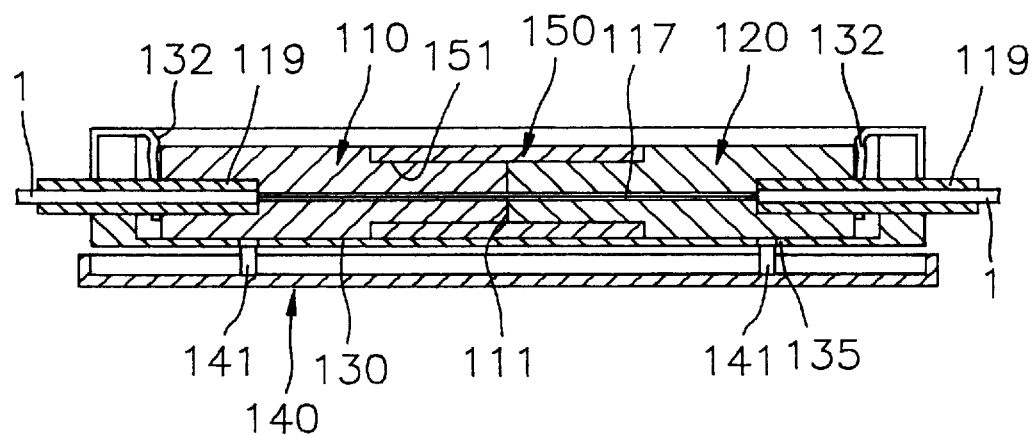
FIGS. 10A and 10B show cross-sectional side views of the connector assembly in FIG. 9.
Figure 10B:
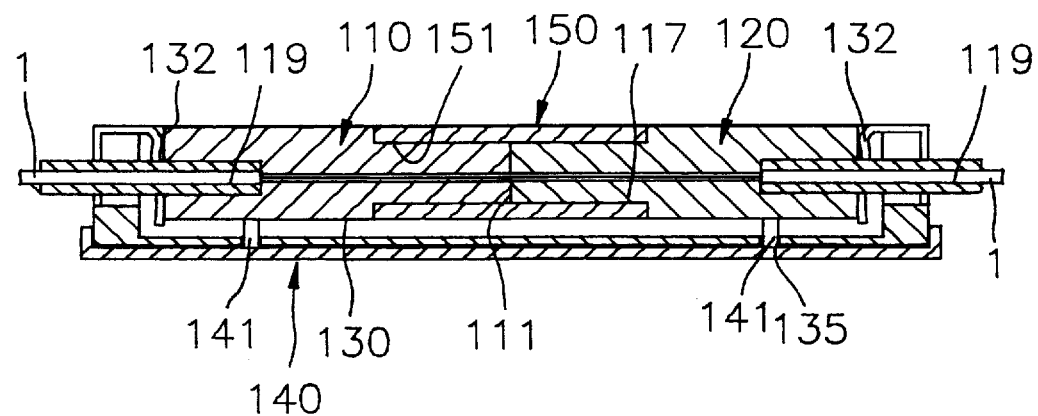
Figure 11:
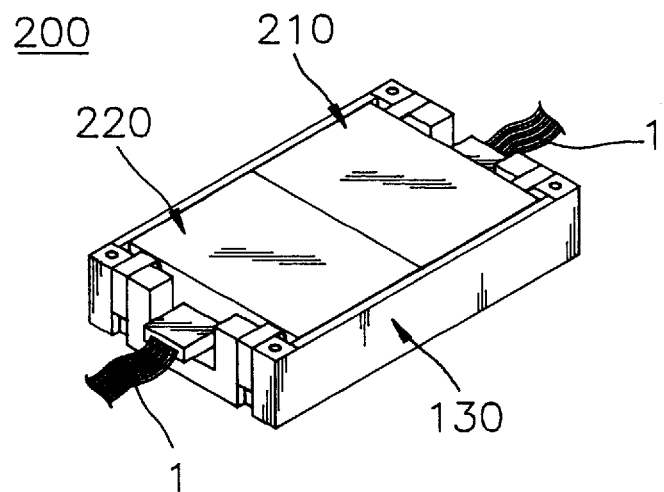
FIG. 11 sets forth a perspective view of a connector assembly in accordance with the second preferred embodiment of the present invention.
Figure 12:
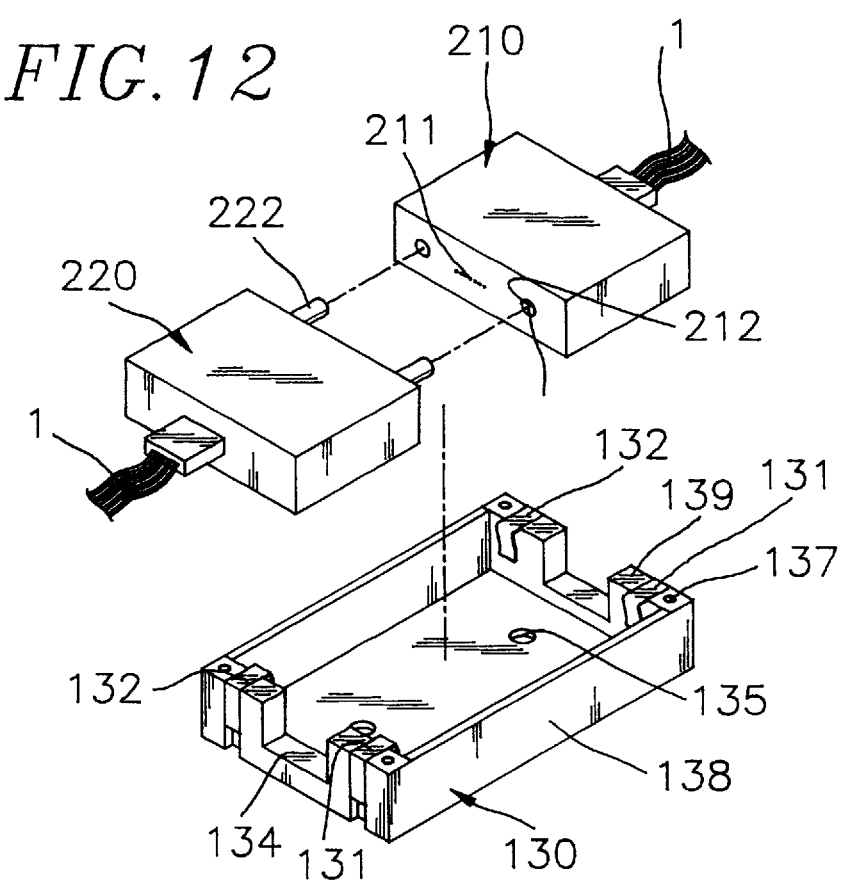
FIG. 12 illustrates an exploded perspective view of the connector assembly in FIG. 11.

There is shown FIG. 8 a cover 140 is provided with four binding holes 143 and a plurality of posts 141 which correspond to the binding holes 137 and the holes 135 of the case 130, respectively. As shown in FIG. 9, the cover 140 is situated on and coupled to the case 130 through the bolts fitted through the binding holes 137 and 143 and the posts 141 contact the upper surface of the connectors 110, 120, thereby securely holding the connectors 110, 120 in position and preventing them from being damaged by external factors. On the other hand, in case of separating the connectors 110, 120 from the case 130, the cover 140 is located under the case 130 in such a way that the posts 141 coincide with the holes 135, respectively, and the case 130 is, then, pressed against the cover 140 so that the posts 141 pass through the holes 135 and press the connectors 110, 120 upwardly, thereby lifting the connectors 110, 120 from the case 130, as shown in FIGS. 10A and 10B.

There is shown in FIGS. 11 to 14a various views of another preferred embodiment of the present invention. The second preferred embodiment is similar to the first except that it comprises a pair of connectors 210 and 220 which are directly connected to each other without using any alignment member. One of the connectors 210 and 220 is provided with a pair of guide holes 212, and the other is provided with a pair of guide pins 222 which correspond to the guide holes 212. Each of the connectors 210 and 220 is also provided with a plurality of through-holes 211 and 221 into which the optical fibers are fitted and terminated at the leading end thereof, respectively, as described in the first preferred embodiment. The connectors 210 and 220 are connected to each other in such a way that the guide pins 222 are fitted into the guide holes 212, respectively, thereby allowing the optical fibers to come in contact with each other.

The connectors 210 and 220 are then inserted into the case 130 as in the first preferred embodiment of the present invention.

According to the present invention, the connectors are securely held connected in position, thereby preventing an unintended disconnection between the optical fibers.

Although the invention has been shown and described with respect to the preferred embodiments, it will be understood by those skilled in the art that various changes and modifications may be made without departing from the spirit and scope of the invention as defined in the following claims.

What is claimed is:

1. A connector assembly for connecting two optical-fiber cables each of which involves at least one optical fiber, the connector assembly comprising:

a pair of connectors each of which is provided with at least one through-hole into which the optical fiber is fitted, wherein one of the connectors has a pair of guide holes and the other has a pair of guide pins fitted into the guide holes, respectively; and a case provided with a bottom plate, a plurality of side walls and at least one pair of clamping members fixed to two of the side walls facing each other, respectively, wherein the connectors are inserted in the case and the opposite clamping members urge the connectors to come in a face-to-face contact with each other.

2. The connector assembly of claim 1, wherein said each connector is further provided with a cavity formed on the rear end thereof and a boot encompassing the optical cable, the boot being inserted in the cavity.

3. The connector assembly of claim 1, wherein the case is further provided with first binding holes formed at corners thereof, respectively, whereby a plurality of connector assemblies are combined together by using fastening means fitted through the binding holes of the case, respectively.

4. The connector assembly of claim 1, further comprising a cover provided with second binding holes which correspond to the first binding holes of the case, respectively, and at least two posts, wherein the cover is coupled on the case in such a way that the posts contact and hold the connectors from being displaced.

5. A connector assembly for connecting two optical cables each of which involves at least one optical fiber, the connector assembly comprising:

a pair of connectors each of which is provided with a contact portion protruding from a leading end thereof and a plurality of through-holes into each of which the optical fiber is fitted, the through-holes running between a leading end of the contact portion and a rear end of the connector;

an alignment member provided with a central hole, wherein the contact portions of the connectors are, from both outsides to inside, fitted into the central hole; and a case provided with a bottom plate, a plurality of side walls and at least one pair of clamping members fixed to two of the side walls facing each other, respectively, wherein the connectors and the alignment member are inserted in the case and the opposite clamping members urge the connectors to come in a face-to-face contact each other.

6. The connector assembly of claim 5, wherein said each connector is further provided with a cavity formed on the rear end thereof and a boot encompassing the optical cable, the boot being inserted in the cavity.

7. The connector assembly of claim 5, wherein said each connector is further provided with at least one guide pin and the alignment member is further provided with at least one guide hole into which the guide pin is fitted.

8. The connector assembly of claim 5, wherein the case is further provided with first binding holes formed at the corners thereof, respectively, whereby a plurality of connector assemblies are combined together by using fastening means fitted through the binding holes of the case, respectively.

9. The connector assembly of claim 5, further comprising a cover provided with second binding holes which correspond to the first binding holes of the case, respectively, and at least two posts, wherein the cover is coupled on the case in such a way that the posts contact and hold the connectors from being displaced.

* * * * *